US008134246B1

(12) United States Patent
Lois

(10) Patent No.: US 8,134,246 B1
(45) Date of Patent: Mar. 13, 2012

(54) FLUID DRIVEN GENERATOR

(76) Inventor: William A. Lois, Brooklyn, NY (US)

( * ) Notice: Subject to any disclaimer, the term of this patent is extended or adjusted under 35 U.S.C. 154(b) by 303 days.

(21) Appl. No.: 12/469,025

(22) Filed: May 20, 2009

(51) Int. Cl.
F03D 3/04 (2006.01)
(52) U.S. Cl. ............................................. 290/44; 290/55
(58) Field of Classification Search .................... 290/44, 290/55
See application file for complete search history.

(56) References Cited

U.S. PATENT DOCUMENTS

| | | |
|---|---|---|
| 1,654,165 A | 12/1927 | Felt |
| 3,793,530 A | 2/1974 | Carter |
| 4,012,163 A | 3/1977 | Baumgartner |
| 4,365,929 A | 12/1982 | Retz |
| 4,609,827 A | 9/1986 | Nepple |
| 5,760,515 A * | 6/1998 | Burns ............................ 310/115 |
| 6,172,429 B1 | 1/2001 | Russell |
| 6,800,955 B2 | 10/2004 | McDavid, Jr. |
| 6,965,174 B2 * | 11/2005 | Wobben ............................ 290/44 |
| 7,132,760 B2 * | 11/2006 | Becker ............................ 290/55 |
| 7,135,786 B1 * | 11/2006 | Deets .............................. 290/55 |
| 2003/0057707 A1 * | 3/2003 | Wu ................................... 290/55 |
| 2007/0018462 A1 | 1/2007 | Richards et al. |
| 2007/0018464 A1 * | 1/2007 | Becker ............................ 290/55 |
| 2008/0263731 A1 * | 10/2008 | Tabe .............................. 903/903 |
| 2008/0273974 A1 * | 11/2008 | Becker .............................. 416/7 |

FOREIGN PATENT DOCUMENTS

| | | |
|---|---|---|
| GB | 2.440.946 | 2/2008 |
| WO | WO03/067081 | 8/2003 |
| WO | WO2007/081776 | 7/2007 |

* cited by examiner

*Primary Examiner* — Quyen Leung
*Assistant Examiner* — Naishadh Desai
(74) *Attorney, Agent, or Firm* — Michael I. Kroll

(57) ABSTRACT

A power generation system utilizes a wind driven turbine to energize a pair of generator disposed on opposing ends of drive shaft having helical propeller fin attached thereto. The units may be installed on the roof a structure in parapet fashion and stacked to increase power output. Furthermore, the wind driven turbine could be incorporated into a ram air drive to recharge the battery of an electric or hybrid vehicle.

13 Claims, 12 Drawing Sheets

FLUID DRIVEN GENERATOR

BACKGROUND OF THE INVENTION

1. Field of the Invention

Figure 1:
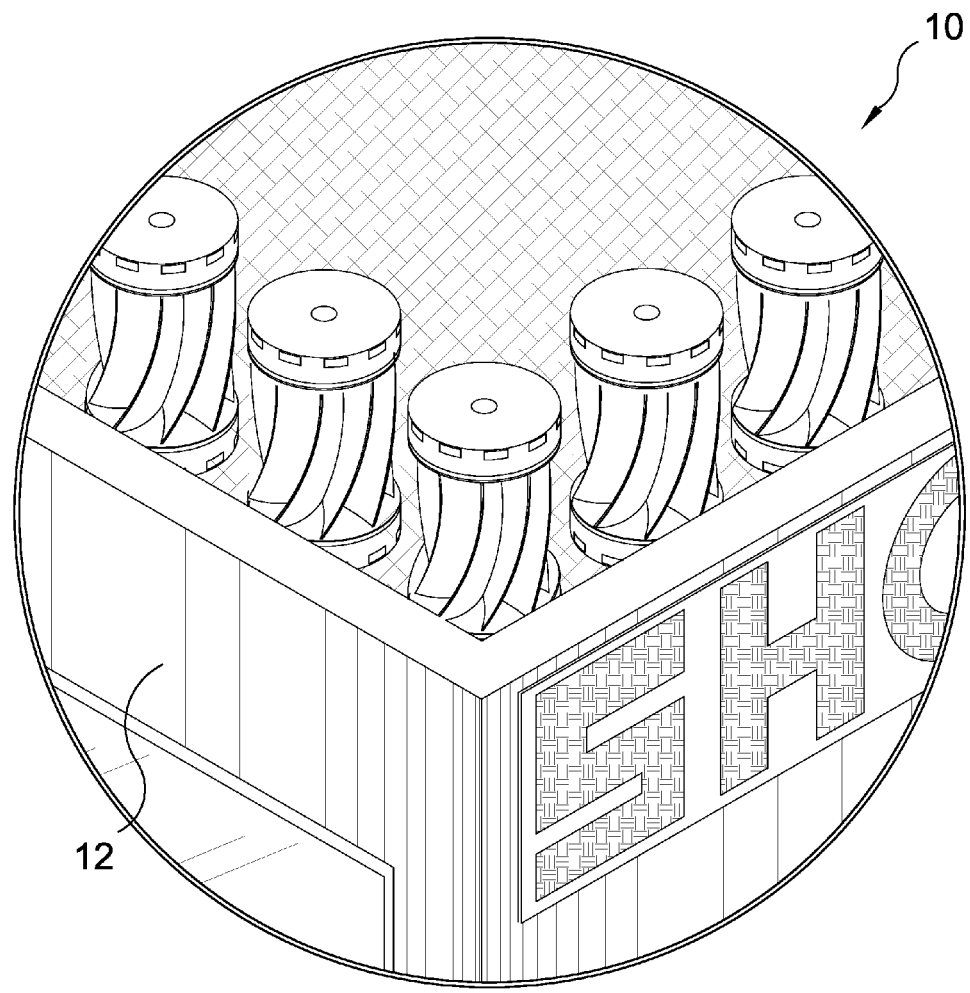

The present invention relates to power generators and more specifically it relates to a wind driven generator comprising a plurality of vertically stacked helical blade propellers driving a shaft with a generator positioned on each end thereof comprising rotating magnets that are driven over a plurality of stationary coils to generate electrical power. The present invention is suited to be located on a structure or integral with a motor vehicle and is transportable.

2. Description of the Prior Art

There are other wind driven generators. Typical of these is U.S. Pat. No. 3,793,530 issued to Carter on Apr. 18, 1973.

Another patent application was issued to Baumgatner on Sep. 8, 1975 as U.S. Pat. No. 4,012,163. Yet another U.S. Pat. No. 4,365,929 was issued to Retz on Jan. 18, 1981 and still yet another was issued on Oct. 9, 1985 to Nepple as U.S. Pat. No. 4,609,827. Another patent was issued to Russell on Apr. 7, 2000 as U.S. Pat. No. 6,172,429. Yet another U.S. Pat. No. 7,132,760 was issued to Becker on Jul. 29, 2003.

U.S. Pat. No. 3,793,530

Inventor: Frank H. Carter

Issued: Apr. 18, 1973

An electric energy generator driven by a wind actuated turbine rotor rotatably supported on a vertically disposed sleeve telescoped over and journaled on a rigid upright supporting post. The rotor includes a plurality of vertically disposed louvers capable of independent pivotal movement about a vertical axis at the inner edge thereof for orientation in radial relation to the rotational axis of the rotor or substantially tangential thereto so that wind will effectively drive the rotor. The rotor is also provided with lift wings on the upper surface thereof which may include stabilizers and shock absorbers fastened to the edge of the wings and the outer edge of the louver support to support part of the load as the rotor whirls in the air thereby providing a floating power device. A wing assembly, which may be hollow and filled with helium gas to reduce the load, is supported on the sleeve above the rotor and includes propeller assemblies mounted thereon to operate the rotor during periods of no wind or only a very slight wind. Governor control means is provided for selectively latching the louvers in tangential relation to the path of movement thereof to prevent the rotor from over-speeding during periods of high wind. Gear assemblies are provided for rotating generators to provide an electrical output that can be used for various purposes thereby utilizing the wind power to produce electrical energy that can be used for various purposes.

U.S. Pat. No. 4,012,163

Inventor: Frank Baumgartner

Issued: Sep. 8, 1975

A turbine type power generator includes a rotor having a vertical shaft to drive a load which may be an electric generator or mechanical gear train or other device for using or transmitting power. Generally vertically extending blades are secured at their ends to the rotor shaft and are set at an angle to the relative wind to be driven thereby. The rotor is surrounded by wind controlling shield means through which the air flow passes to contact the blades in the proper direction for causing rotation. The free flow air inlet area is substantially less than the maximum projected area of the shield means normal to the relative wind so that the total wind trapped must flow through a reduced area with a consequent increase in velocity to impart more energy to the rotor blades. One form of shield means is a structure of the same general shape as the rotor surrounding the rotor on all sides and having vertically extending passages spaced around its perimeter to lead the air flow to the blades. Another form of shield means is an elongate, horizontally extending tube with the rotor mounted therein at an intermediate position. The inlet opening of the tube is larger than the throat area and the trapped wind is increased in velocity before it contacts the rotor blades.

U.S. Pat. No. 4,365,929

Inventor: Phillip Retz

Issued: Jan. 16, 1988

The tower comprises a base supported on a framework which mounts a wind powered turbine having a vertical axis of rotation. Air is channeled to the turbine rotor to cause counterclockwise rotation thereof by upper and lower wind deflectors. The wind deflectors include channels which cause the oncoming air to swirl in a counterclockwise motion into the rotor transmitting energy thereto. The vertical struts of the framework are also configured so as to deflect the oncoming air into the rotor in a counterclockwise direction. The rotor itself comprises columns of vertically spaced, radially extending scoops and radially extending curved blades to ensure highly efficient energy conversion. The rotor is formed with no center shaft to allow free flow of air therethrough.

U.S. Pat. No. 4,609,827

Inventor: Richard Nepple

Issued: Oct. 9, 1985

A vertical axis wind powered generator apparatus has airfoil shaped vanes, a positive and synchronous vane orientation system which is controlled by a mechanism located exterior to its rotor, two innovations for improving its aerodynamic efficiency and for increasing the rotary force and horsepower developed by a tall wind generator apparatus used to power a driven machine, and a system for operational control of the device.

U.S. Pat. No. 6,172,429

Inventor: Thomas H Russell

Issued: Apr. 7, 2000

A system for recovering energy from the natural and man made sources of wind, water and sunshine provides within a given local area wind, water and solar apparatuses for converting all three wind, water and solar energies to electrical power to provide a reasonably steady supply of electrical power at all times. The wind and water apparatuses may be double speed Savonius rotor electrical generating apparatuses each of which includes two Savonius type rotors mounted adjacent to one another for rotation about a common axis with the blades of the rotor units being arranged so that the rotor units rotate in opposite directions relative to one another under the influence of a given wind or flow of water. The electrical generator of each apparatus includes a field means attached to one of the two rotors and an armature attached to the other of the two rotors so that the field means and armature rotate relative to one another at a speed approximately double the speed of rotation of each of the rotor units about the common rotational axis.

U.S. Pat. No. 6,800,955

Inventor: William K. McDaniel Jr.

Issued: Sep. 30, 2002

A fluid-powered energy conversion device converts energy in a moving fluid into mechanical energy. A rigid cylindrical frame of toroidal baffles forms an upstream annular chamber and a downstream annular chamber, each of the chambers having open sides to allow entry of the fluid. The toroidal baffles create an upstream drive vortex in an upstream central vortex chamber, and a downstream extraction vortex rotating in the opposite direction in a downstream central vortex chamber. A plurality of hinged louvers surround the vortex chambers and allow the fluid to enter each chamber only in the direction of vortex rotation, and prevent the fluid from exiting through the sides of the device. The drive vortex passes through and rotates a turbine in a central aperture between the chambers. The turbine is rotated by rotational momentum of the drive vortex, lift from each turbine blade, and additional momentum imparted by the vortex reversal.

U.S. Pat. No. 4,411,591

Inventor: William S Becker

Issued: Jul. 29, 2003

A hybrid blade wind turbine device formed of at least a pair of straight outer airfoil blades, and a pair of inner helical wing blades, as supported for rotation within a safety protective cage structure, which wind turbine can be mounted in the vertical, horizontal, or other aligned operational positions. The inner helical half wing blades, being preferably somewhat shorter than the length of the outer airfoil blades, act to "regularize" the swirling wind regime flowing through the hybrid wind turbine, so as to maximize the efficiency of the outer airfoil blades. The helical half wing blades can be formed of individual segmented vane segments to provide improved operational capabilities for the overall hybrid wind turbine. To best harness annualized available wind conditions, the hybrid wind turbine can be customized, through modification of the number of vane segments, the selection of the specific shape of the outer airfoil blades, and the specific operational positioning of the outer airfoil blades. Alternatively, the helical half wing blades can be formed as generally smooth-walled blades.

While these wind driven turbine systems may be suitable for the specific individual purposes to which they address, they would not be suitable for the purposes of the present invention.

SUMMARY OF THE PRESENT INVENTION

A primary object of the present invention is to provide a wind generator having a caged housing containing a plurality of helical blades driving a shaft.

An additional object is to provide a wind generator having a pair of generators positioned on each end of the shaft.

Yet an additional object is to provide a wind generator wherein each of said pair of generators comprises rotating magnets that are driven through a plurality of stationary coils.

Still yet an additional object is to provide a wind generator providing a plurality of stacked generators to increase power output.

An additional object is to provide a wind generator positionable within a structure having an opening and funnel structure of decreasing cross section forming a ram air drive to the generator.

Still another object of the present invention is to provide a wind generator wherein said ram air drive could be incorporated into motorized vehicles as a power source.

Yet another object of the present invention is to provide a wind generator that is mobile and transportable.

A further object is to provide a wind generator that is simple and easy to use.

A still further object is to provide wind generator that is economical in cost to manufacture and operate.

Additional objects of the present invention will appear as the description proceeds.

The present invention overcomes the shortcomings of the prior art by providing a wind driven turbine generator comprising propeller fins encircling a drive shaft linked to a pair of generators positioned on each end of the drive shaft wherein said turbine generators are stackable and can be incorporated into a structure or a motor vehicle.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings.

Figure 2:
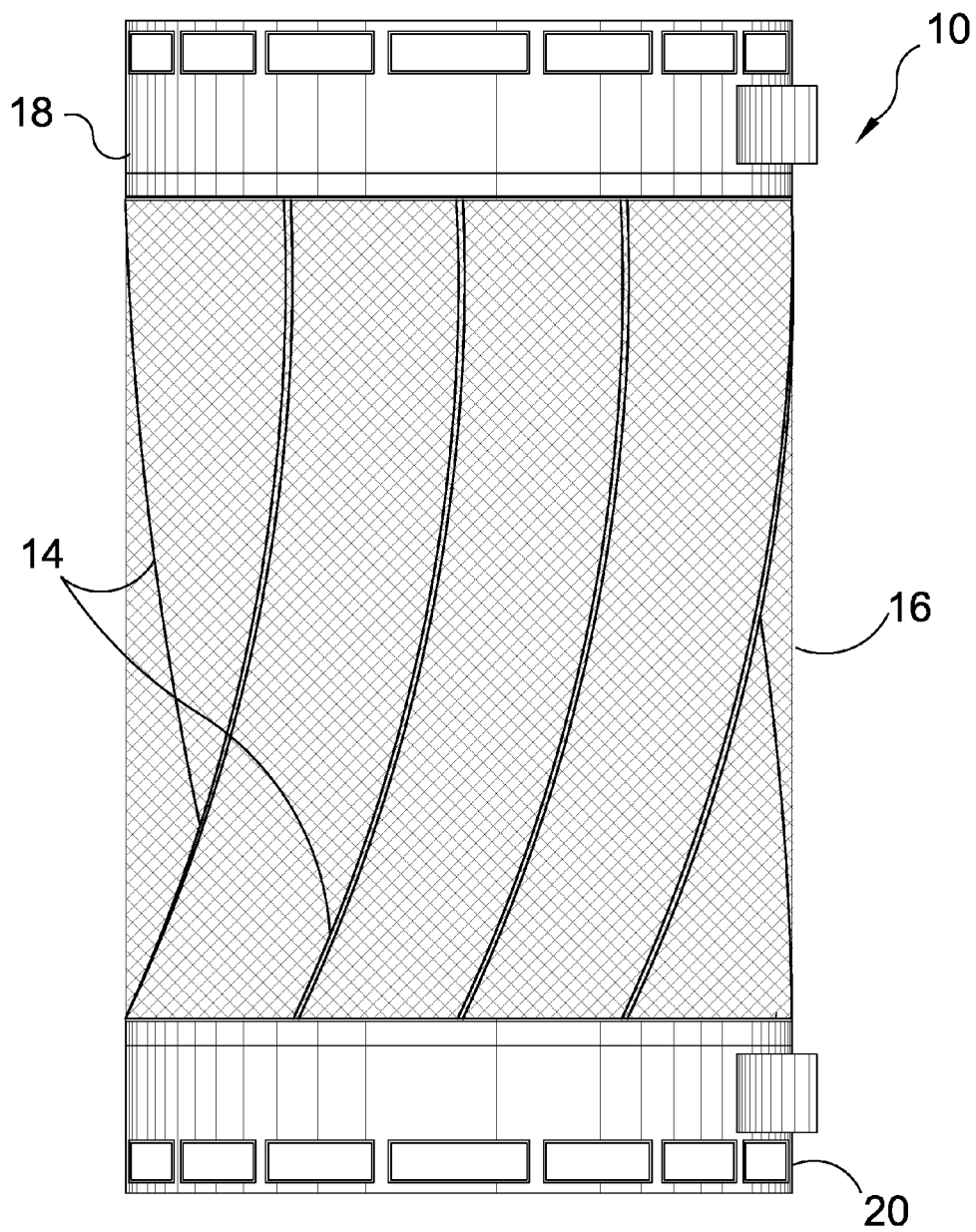
Figure 3:
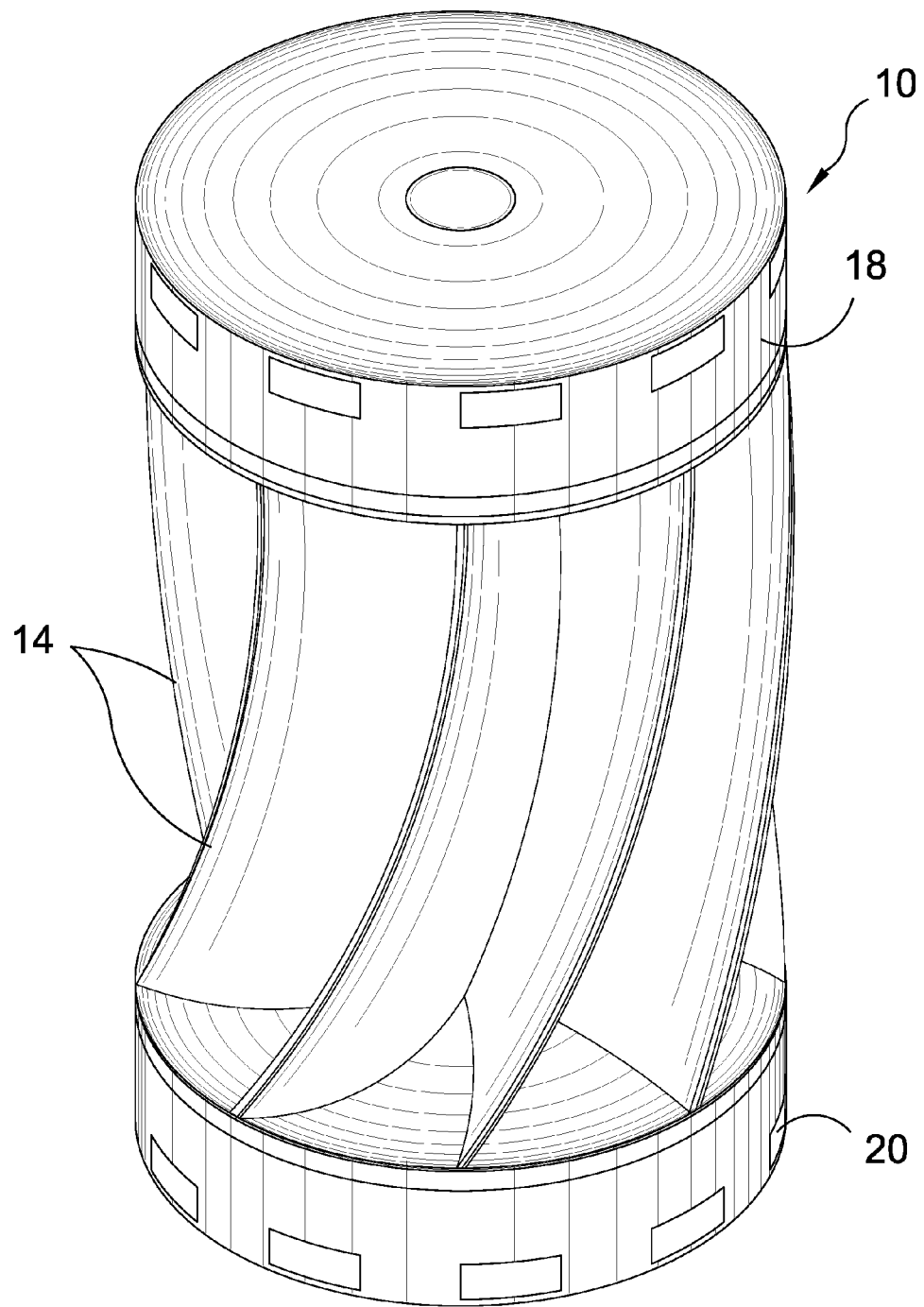
Figure 4:
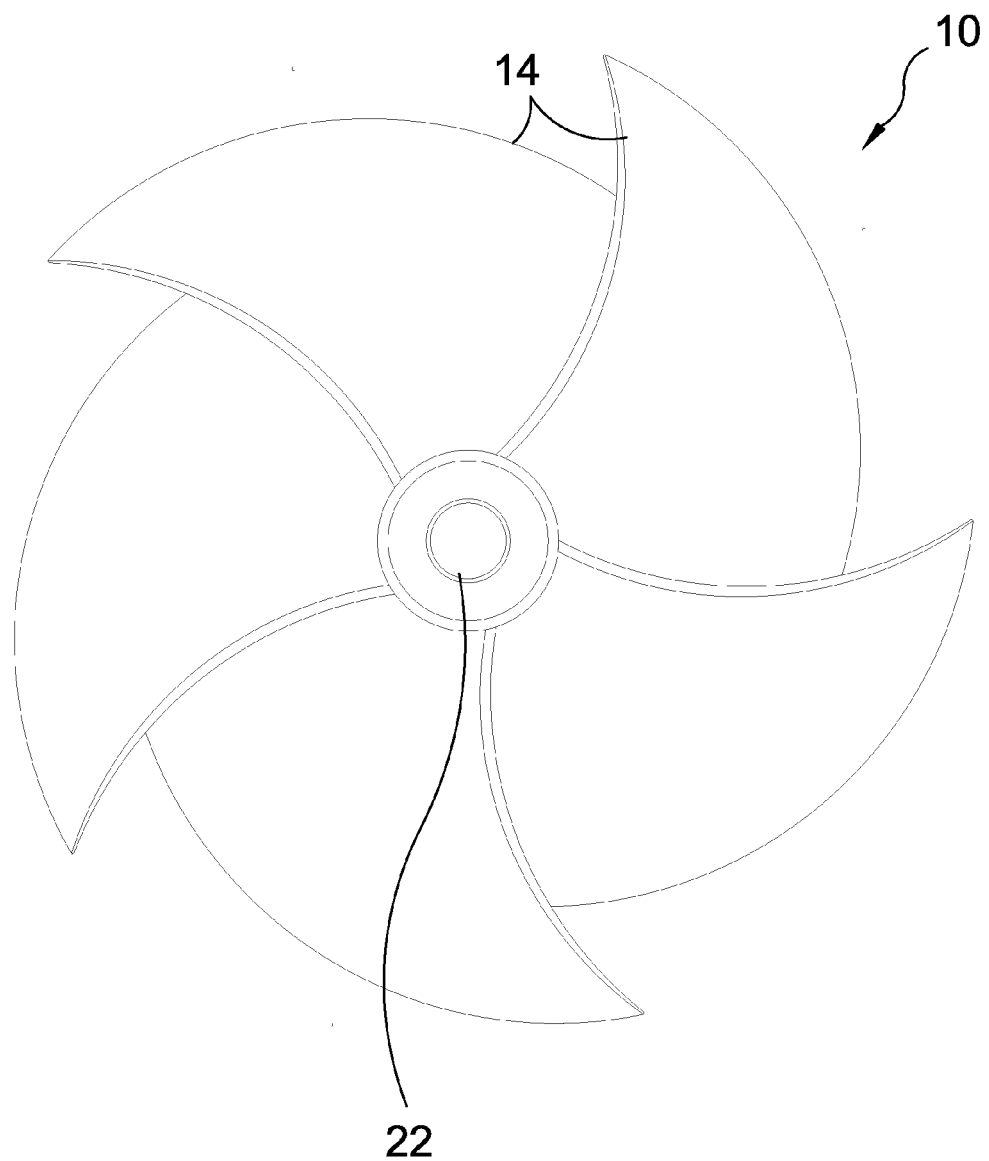
Figure 5:
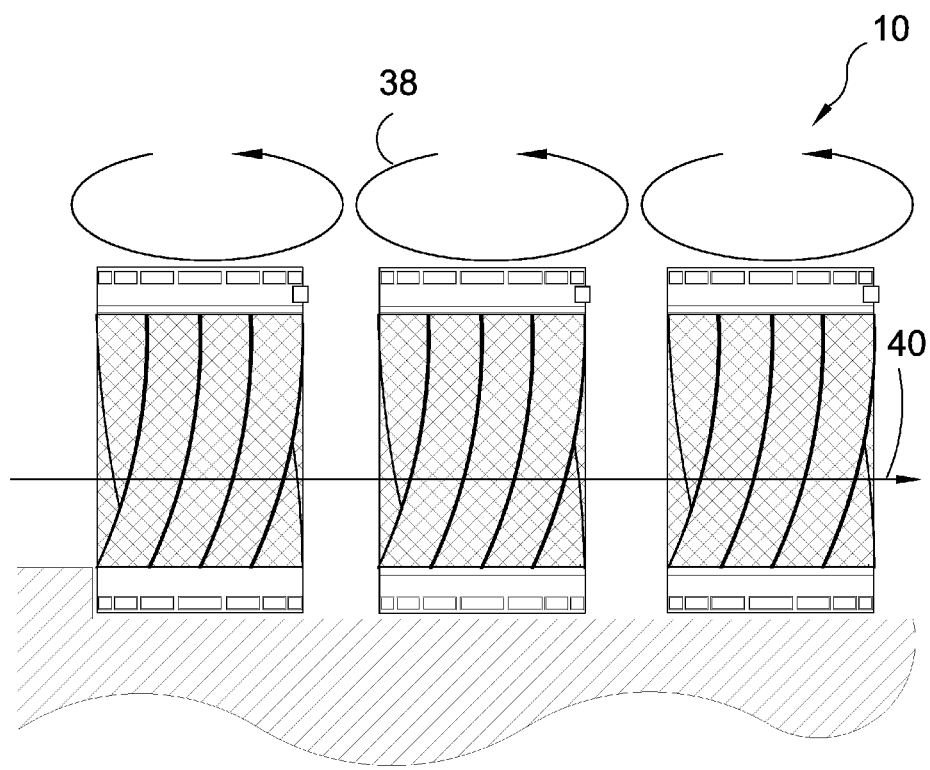
Figure 6:
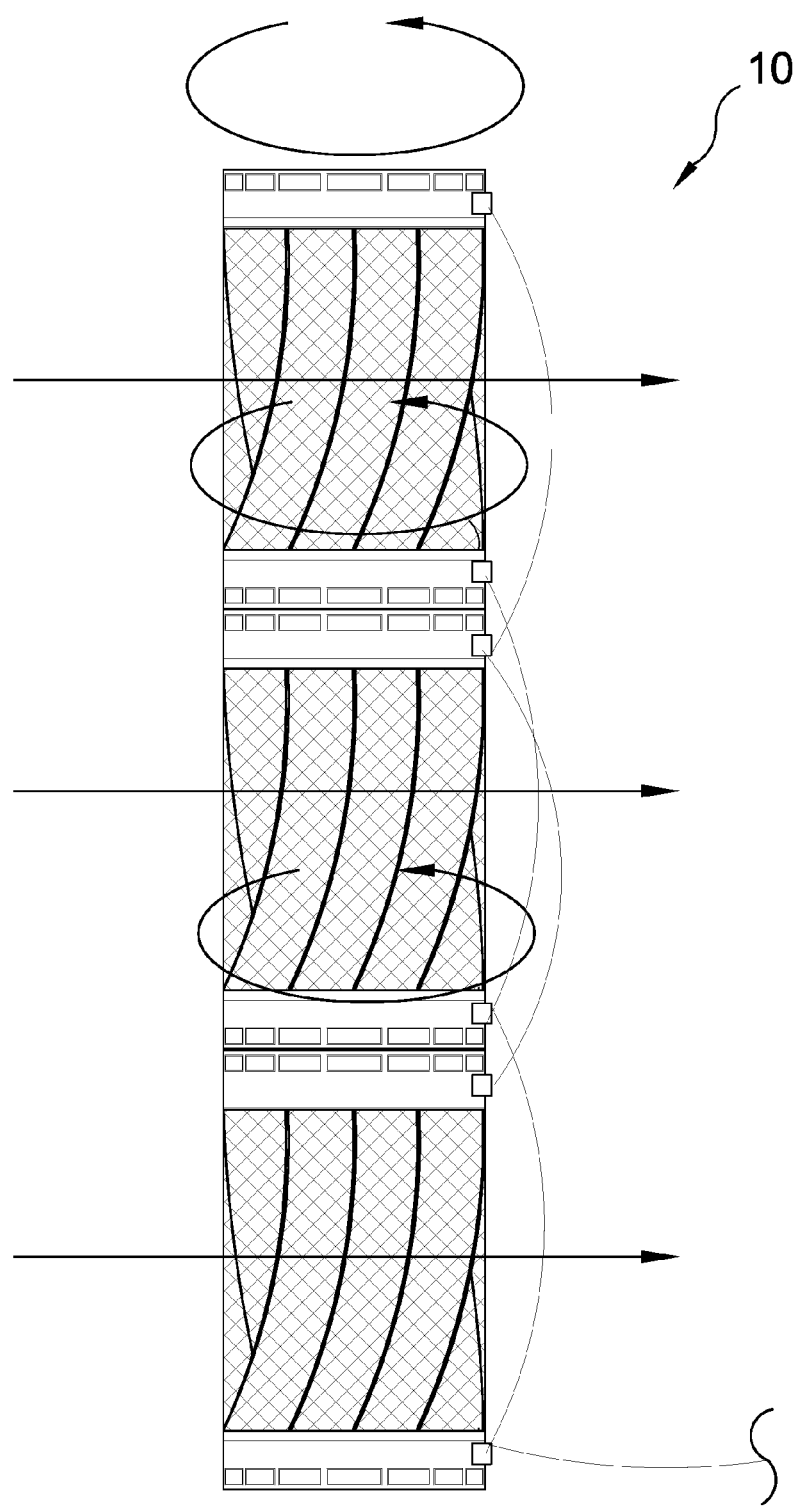
Figure 7:
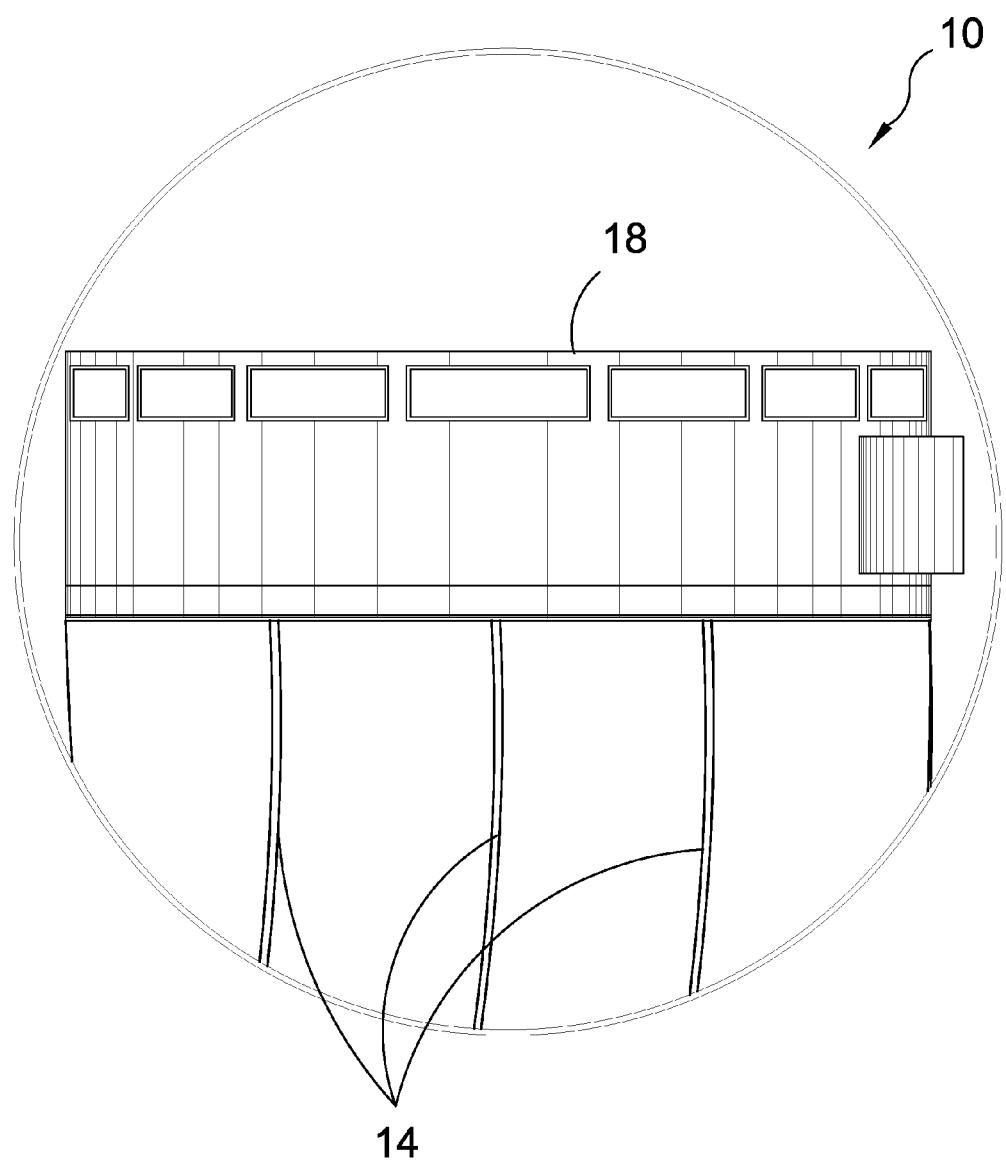
Figure 8:
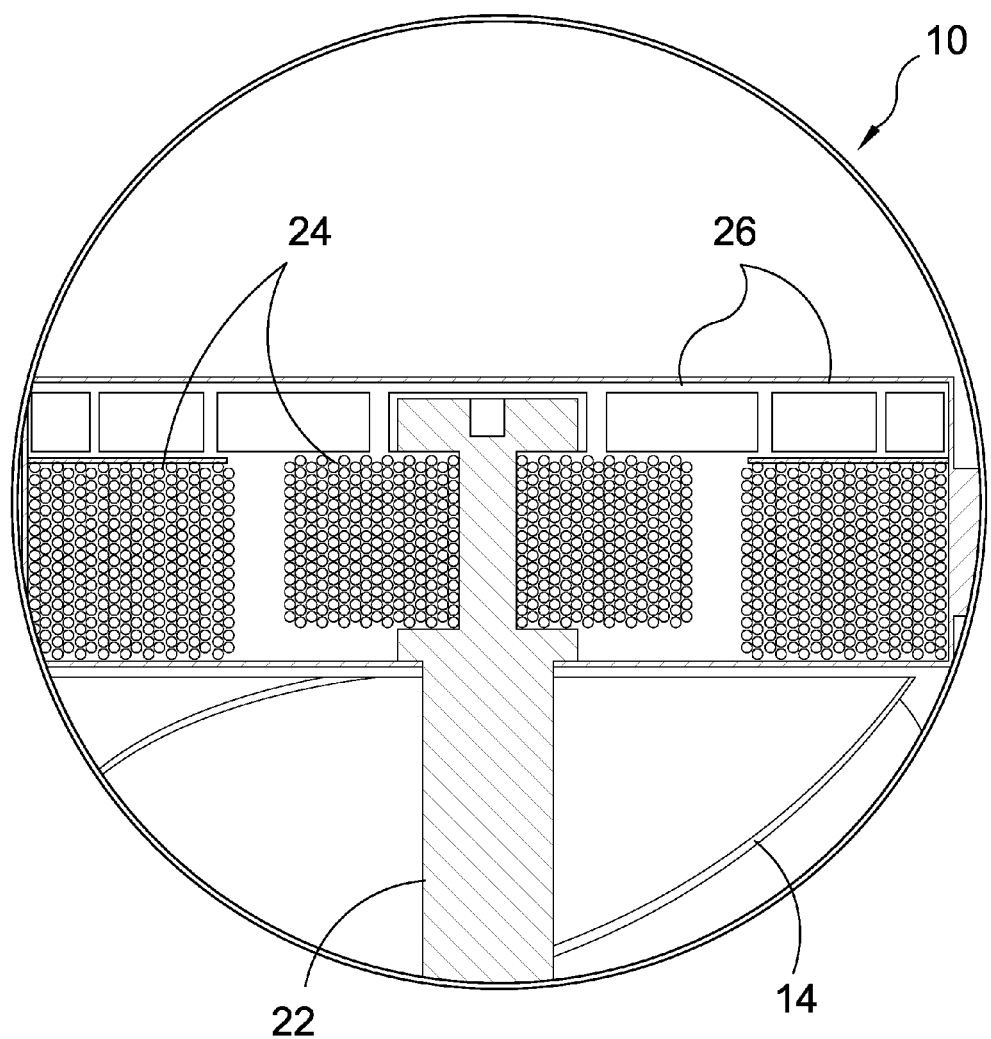
Figure 9:
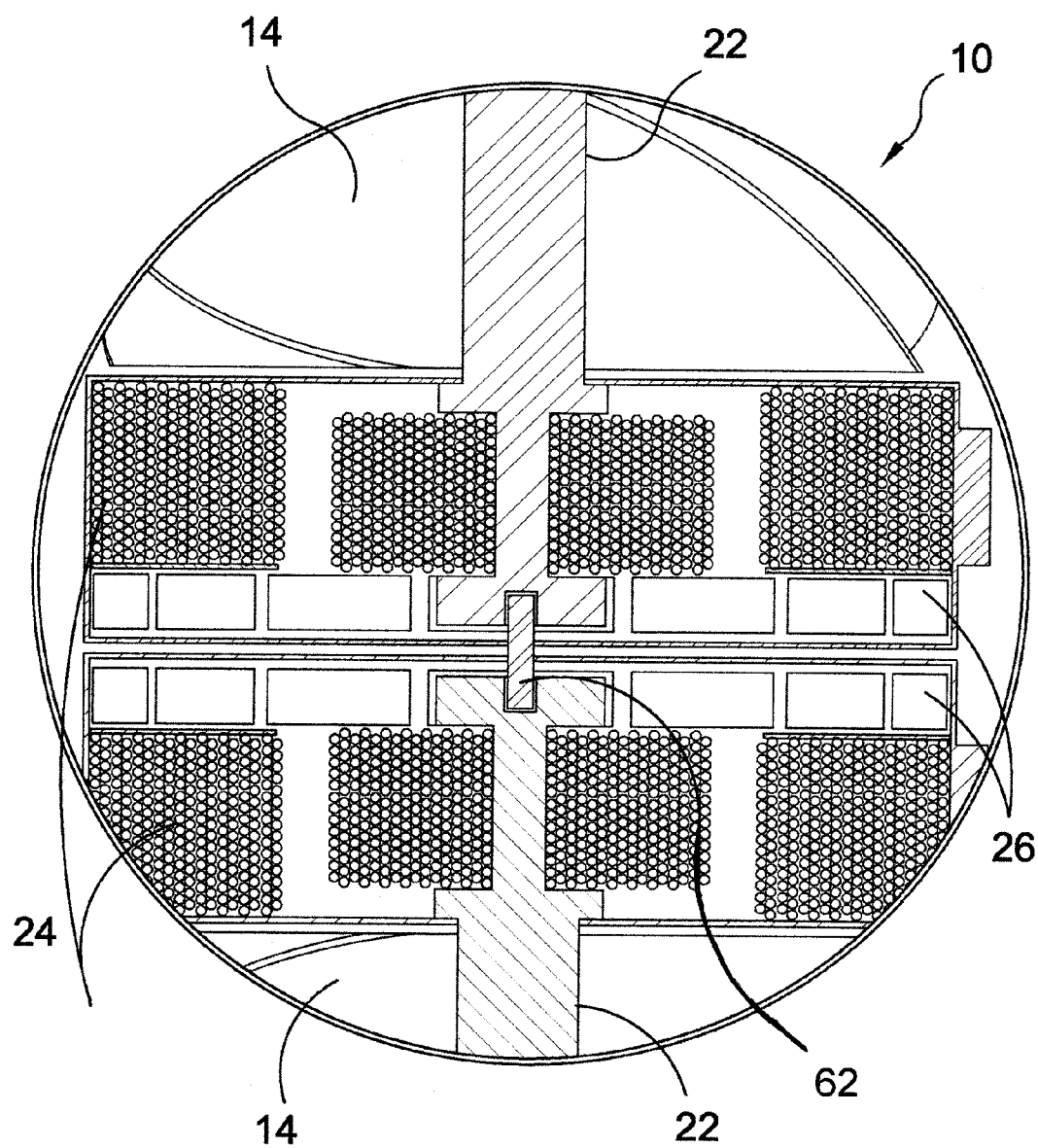
Figure 10:
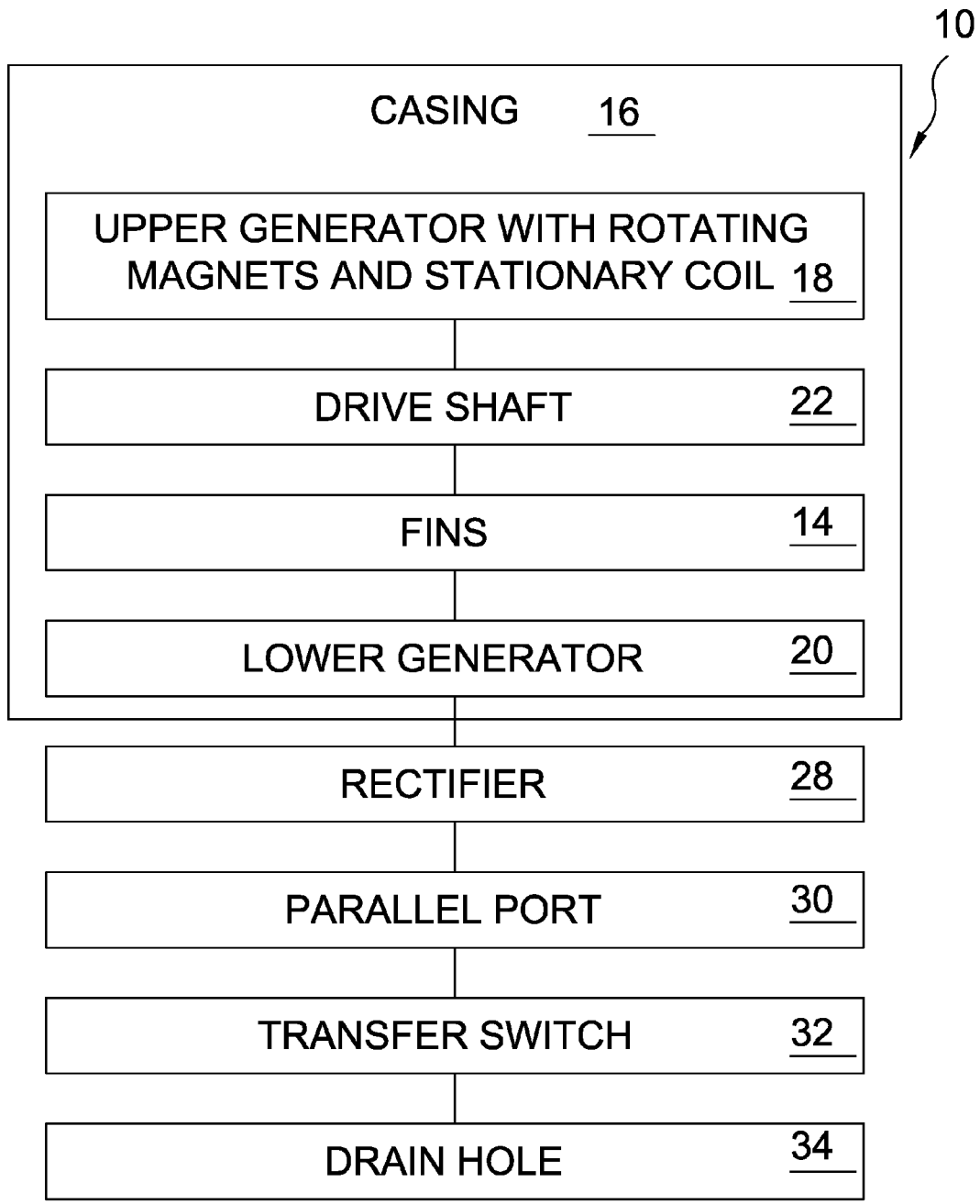
Figure 11:
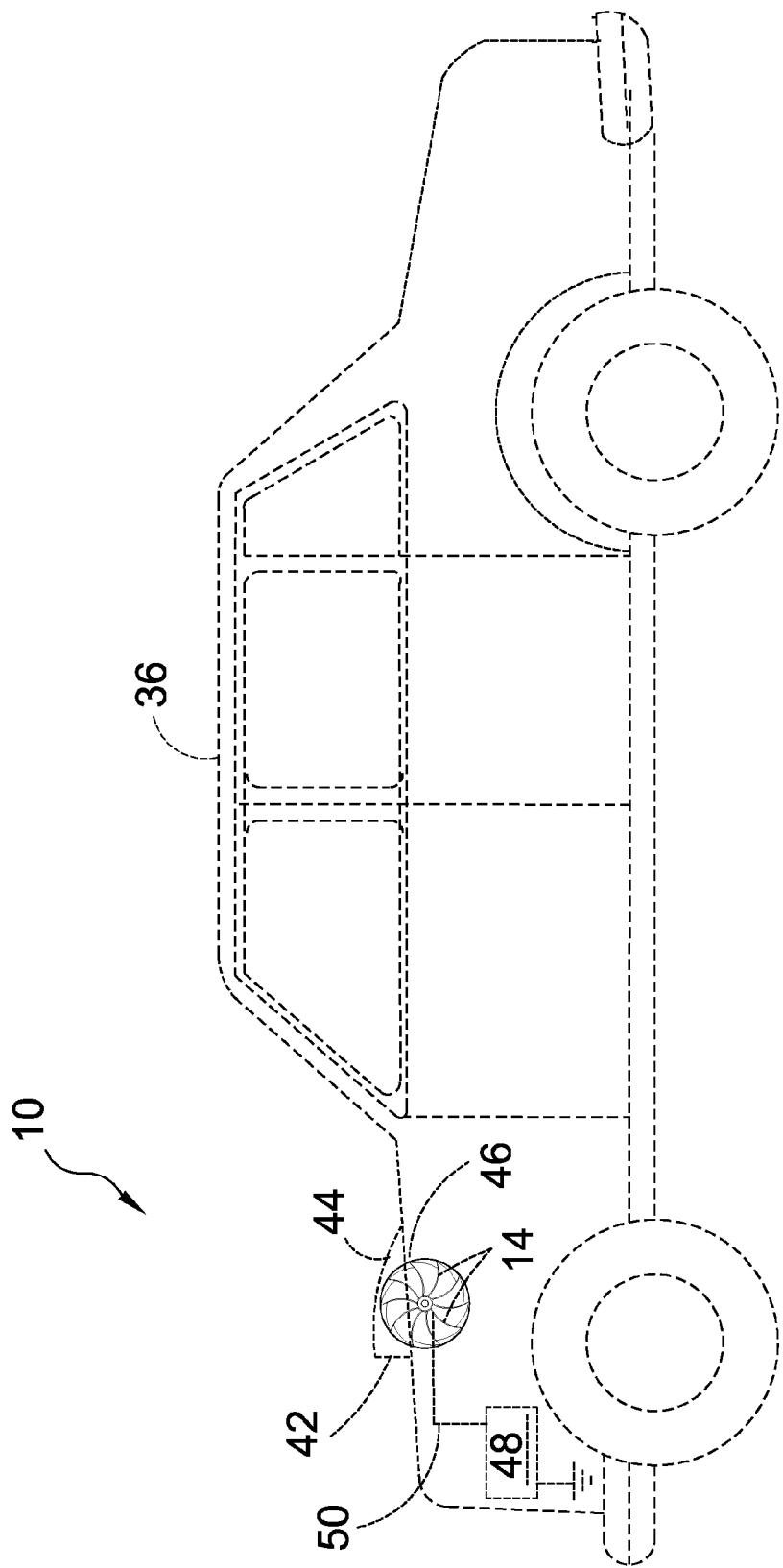
Figure 12:
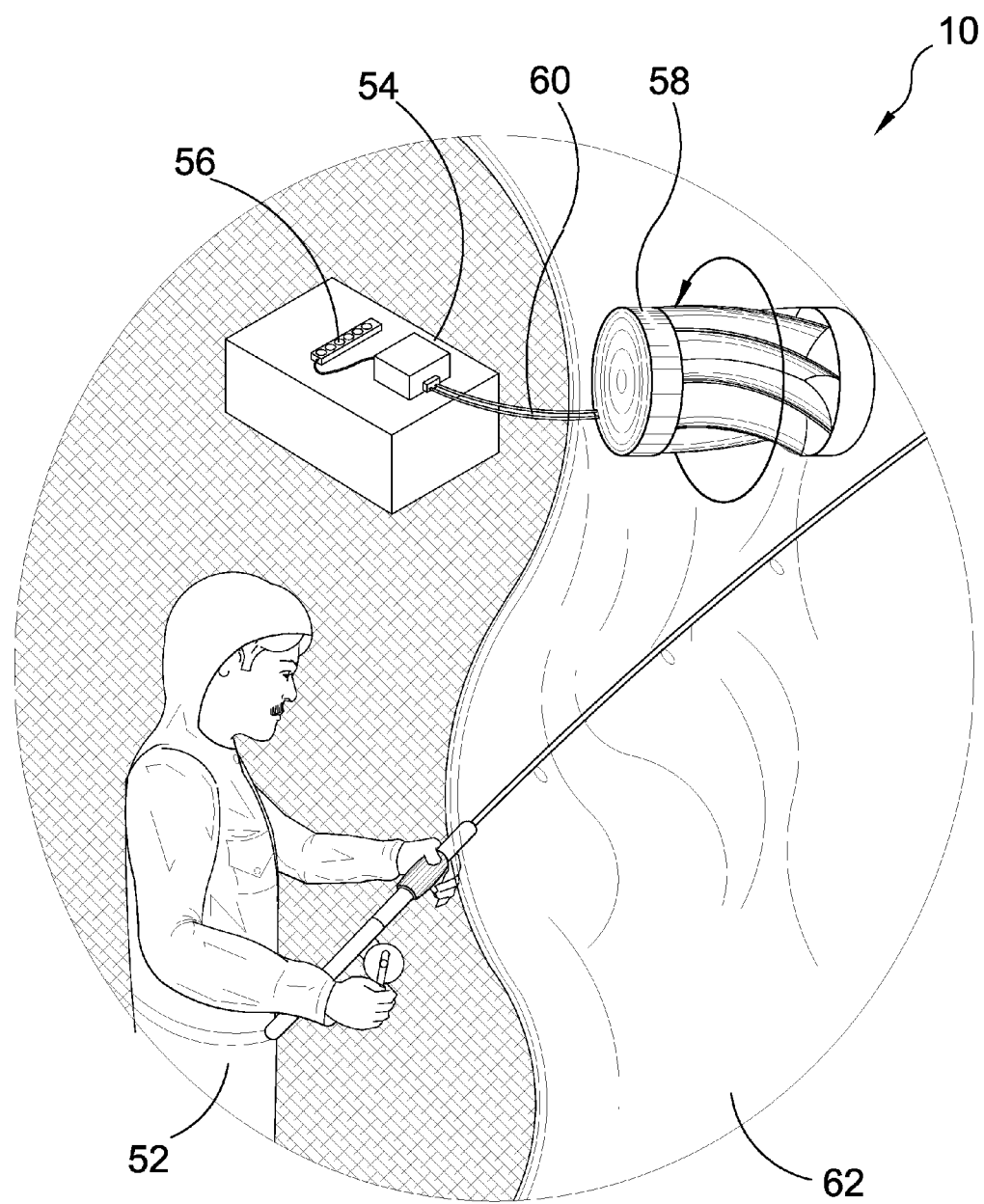

FIG. 1 is an illustrative view of the present invention's use.
FIG. 2 is a side view of the present invention.
FIG. 3 is a perspective view of the present invention.
FIG. 4 is a top view of the present invention.
FIG. 5 is a side view of the present invention.
FIG. 6 is a side view of the present invention.
FIG. 7 is a detailed side view of the present invention.
FIG. 8 is a detailed sectional view of the present invention.
FIG. 9 is a detailed sectional view of the present invention.
FIG. 10 is a block diagram of the essential components of the present invention.
FIG. 11 is side view of the present invention integral with a motor vehicle.
FIG. 12 is an additional element of the present invention.

DESCRIPTION OF THE REFERENCED NUMERALS

Turning now descriptively to the drawings, in which similar reference characters denote similar elements throughout the several views, the figures illustrate the Wind Driven Turbine Generator of the present invention. With regard to the reference numerals used, the following numbering is used throughout the various drawing figures.

10 Wind Driven Turbine Generator of the present invention
12 building structure
14 propeller fins
16 casing 18 upper generator
20 lower generator
22 drive shaft
24 magnet
26 stationary coil
28 rectifier
30 parallel port
32 transfer switch
34 drain hole
36 vehicle
38 wind
40 rotation of fins and drive shaft
42 ram air drive
44 scoop of 36
46 vent
48 battery of 36
50 electrical connection
52 user
54 battery
56 outlets
58 submersible housing
60 water
62 interconnecting member

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

FIG. 1 is an illustrative view of the present invention 10 in use. Shown is the present invention being a wind generator 10 wherein a plurality of generators is positioned on the roof of a structure 12.

FIG. 2 is a front perspective view of the present invention 10. Shown is the wind driven generator 10 having a plurality of fins 14 housed within a casing 16. Wind passes through the casing 16 and rotates the fins 14 to power the upper generator 18 and the lower generator 20.

FIG. 3 is a perspective view of the present invention 10. Shown is an assembled view of a turbine that can be positioned in a water stream to generate electrical power. The fins 14 are driven by the water current to provide kinetic energy to the upper generator 18 and the lower generator 20.

FIG. 4 is a top view of the helical fins 14 of the present invention 10. the rotation of the fins 14 turn a drive shaft 22 to power the upper and lower generators.

FIG. 5 is a side view of the present invention 10. Shown is a plurality of wind driven generators 10 ganged together to increase power output. Also shown is the wind 38 and the direction of rotation of the fins 40.

FIG. 6 is a side view of the present invention 10 with a plurality of generators stacked to increase power input.

FIG. 7 is a detailed view of the present invention 10. Shown are the fins 14 and the upper generator 18.

FIG. 8 is a detailed sectional view of the present invention 10. Shown are the fins 14 associated with the drive shaft 22 to rotate a plurality of magnets 24 through a plurality of coils 26 to generate electricity.

FIG. 9 is a detailed sectional view of two wind driven generators 10 stacked together. Shown are the drive shafts 22 with their associated fins 14 and magnets 24 passing through the coils 26. An interconnecting member 62 is shown that interconnects the drive shafts of stacked adjacent wind (or fluid) powered generators.

FIG. 10 is a block diagram of the primary components of the present invention 10. Shown are the upper 18 and lower 20 generators powered by the fins 14 rotating the drive shaft 22 within a casing 16 with a drain hole 34. Also shown are a rectifier 28, parallel port 30 and transfer switch 32.

FIG. 11 shows the present invention 10 in use with a motor vehicle 36 with a ram air drive 42. The air from the moving vehicle 36 is forced into and pressurized by the scoop 44 to turn the fins 14 and is released by a vent 46. Electrical power is transferred to the battery 48 via an electrical connection 50.

FIG. 12 is an additional element of the present invention. Illustrated is the generator having a waterproof housing 58 whereby user 52 can submerge generator 10 in a stream or river 62 to use water as the motive force for charging a battery 54 that can be used to provide power 56 for portable devices such as cell phones while camping or off-road. Electrical power is transferred to the battery 54 via an electrical connection 60.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A fluid powered generator unit comprising:
 a) a drive shaft having a first end, a second end, and a center point on said drive shaft half way between a first and a second generator;
 b) a plurality of helical fins integral with said drive shaft, said plurality of helical fins positioned around said center point and extending toward said first and second ends of said drive shaft;
 c) a first housing positioned on said first end of said drive shaft, said first housing forming a base for supporting said fluid powered generator unit when placed on a surface, a second housing positioned on a second end of said drive shaft, said second housing having an upper support surface, a first generator disposed within said first housing attached to said first end of said drive shaft, a second generator disposed within said second housing attached to said first end of said drive shaft;
 d) an electrical connection to at least one battery;
 e) a mesh casing extending from said first to said second housing to protect said plurality of helical fins while letting fluid flow freely therethrough; and
 f) whereby said upper support surface of said second housing is capable of supporting another fluid powered generator unit stacked thereon.

2. The fluid powered generator unit according to claim 1, wherein a plurality of fluid powered generator units are stacked vertically to maximize power output, wherein said first and second ends of each said drive shaft have a recess therein for receiving at least one interconnecting member, where each interconnecting member extends between adjacent fluid powered generators through their respective housings and into the respective recesses of the respective drive shafts, thereby interlocking the drive shafts of the stacked fluid power generator units.

3. The fluid powered generator unit according to claim 1, wherein each of said first and second generators comprise a plurality of magnets that pass through a plurality of stationary coils to transfer the kinetic energy into electrical power.

4. The fluid powered generator unit according to claim 1, wherein said drive shaft is low friction to produce energy efficiently.

5. The fluid powered generator unit according to claim 1, wherein said fluid powered generator unit is positioned in a location wherein it is exposed to wind or forced air.

6. The fluid powered generator unit according to claim 1, wherein a plurality of fluid powered generator units are positioned on a roof of a structure to receive wind to produce electrical power for usage or storage.

7. The fluid powered generator unit according to claim 1, wherein said fluid powered generator unit is horizontally disposed in a funnel section of a hood of a motor vehicle with a wide input port and decreasing in cross section to form a ram air drive wherein said shaft of said fluid powered generator unit is transverse to a length of said vehicle.

8. The fluid powered generator unit according to claim 7, wherein said motor vehicle is electric or hybrid, said fluid powered generator unit and said ram air drive serving to supply electricity to batteries of said vehicle.

9. The fluid powered generator unit according to claim 1, wherein said fluid powered generator unit is mobile, transportable, and said first and second housing are waterproof allowing said fluid powered generator unit to be submerged in water to use the water as the motive force to drive the helical fins.

10. The fluid powered generator unit according to claim 1, wherein said electrical connection to said battery further comprises a rectifier.

11. The fluid powered generator unit according to claim 1, wherein said electrical connection to said battery includes a parallel port.

12. The fluid powered generator unit according to claim 1, wherein said electrical connection to said battery further comprises a transfer switch.

13. The fluid powered generator unit according to claim 1, where the first housing, the second housing, and the mesh casing all have a diameter that is substantially the same.

* * * * *